(12) United States Patent
Burr (10) Patent No.: US 10,523,479 B2
(45) Date of Patent: Dec. 31, 2019

(54) MODULATING COMMUNICATIONS BETWEEN PLATFORMS ONTO POWER DELIVERY RAILS

(71) Applicant: Intel Corporation, Santa Clara, CA (US)

(72) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/173,806

(22) Filed: Oct. 29, 2018

(65) Prior Publication Data

US 2019/0173699 A1    Jun. 6, 2019

Related U.S. Application Data

(63) Continuation of application No. 14/567,034, filed on Dec. 11, 2014, now Pat. No. 10,116,474.

(51) Int. Cl.
| | | |
|---|---|---|
| *H04B 3/00* | (2006.01) | |
| *H04L 27/00* | (2006.01) | |
| *H04B 3/54* | (2006.01) | |
| *H04L 27/20* | (2006.01) | |
| *H04L 27/12* | (2006.01) | |

(52) U.S. Cl.
CPC ......... *H04L 27/0002* (2013.01); *H04B 3/542* (2013.01); *H04B 3/548* (2013.01); *H04L 27/122* (2013.01); *H04L 27/2003* (2013.01)

(58) Field of Classification Search
CPC .. H04B 3/00; H04B 5/00; H01B 11/00; H04L 25/0272; H04L 12/2898

USPC ........................ 375/222, 257; 348/77; 455/68
See application file for complete search history.

(56) References Cited

U.S. PATENT DOCUMENTS

| | | | | |
|---|---|---|---|---|
| 2007/0173202 A1* | 7/2007 | Binder | ............... | H04B 7/15542 455/68 |
| 2008/0247447 A1* | 10/2008 | Abraham | ................ | H04L 27/10 375/222 |
| 2008/0280569 A1 | 11/2008 | Hazani et al. | | |
| 2013/0043985 A1* | 2/2013 | Lai | ......................... | G05B 19/19 340/12.32 |
| 2013/0201316 A1* | 8/2013 | Binder | ..................... | H04L 67/12 348/77 |

OTHER PUBLICATIONS

Office Action for U.S. Appl. No. 14/567,034, dated Jan. 4, 2016, 10 pages.

(Continued)

*Primary Examiner* — Chieh M Fan
*Assistant Examiner* — Fitwi Y Hailegiorgis
(74) *Attorney, Agent, or Firm* — Jordan IP Law, LLC (57) ABSTRACT

Systems and methods may receive data from a data interface of a base platform, convert the data into an analog signal and modulate the analog signal onto a direct current (DC) power line coupled to a connector of the base platform. Additionally, the modulated analog signal may be received from a DC power line coupled to a connector of a tablet platform, wherein the modulated analog signal is converted to a digital signal and demodulated to recover the data. In one example, the data includes user input data associated with an input device including one or more of a mouse, a keyboard, a keypad or a touchpad.

12 Claims, 4 Drawing Sheets

(56) References Cited

OTHER PUBLICATIONS

Final Office Action for U.S. Appl. No. 14/567,034, dated Jul. 12, 2016, 12 pages.
Notice of Panel Decision from Pre-Appeal Brief Review for U.S. Appl. No. 14/567,034, mailed Oct. 24, 2016, 3 pages.
Notice of Allowance for U.S. Appl. No. 14/567,034, dated Jun. 27, 2018, 7 pages.

* cited by examiner

MODULATING COMMUNICATIONS BETWEEN PLATFORMS ONTO POWER DELIVERY RAILS

CROSS-REFERENCE TO RELATED APPLICATIONS

The present application claims the benefit of priority to U.S. Non-Provisional patent application Ser. No. 14/567,034 filed on Dec. 11, 2014.

TECHNICAL FIELD

Embodiments generally relate to inter-platform communications. More particularly, embodiments relate to modulating communications between platforms onto power delivery rails.

BACKGROUND

Recent developments in computing systems have resulted in convertible systems that are able to transition between a notebook computer form factor and a tablet computer form factor. In some instances, such a system may include a tablet subsystem/platform that houses a touchscreen display and a base subsystem/platform that houses an embedded keyboard. Communications between the two subsystems may typically be conducted over a USB (Universal Serial Bus, e.g., USB Specification 3.0, Rev. 1.0, Nov. 12, 2008, USB Implementers Forum) connection and/or an I2C (Inter-Integrated Circuit, e.g., I2C Specification UM10204, Rev. 03, Jun. 19, 2007, NXP Semiconductors) connection. The I2C connection may occupy dedicated pins in the physical connector between the tablet and base, wherein the dedicated pins may lead to an increased connector size and/or greater overall system cost. Moreover, tunneling the I2C communications across the USB connection may add unacceptable delays in the communication path and render the link inoperable.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
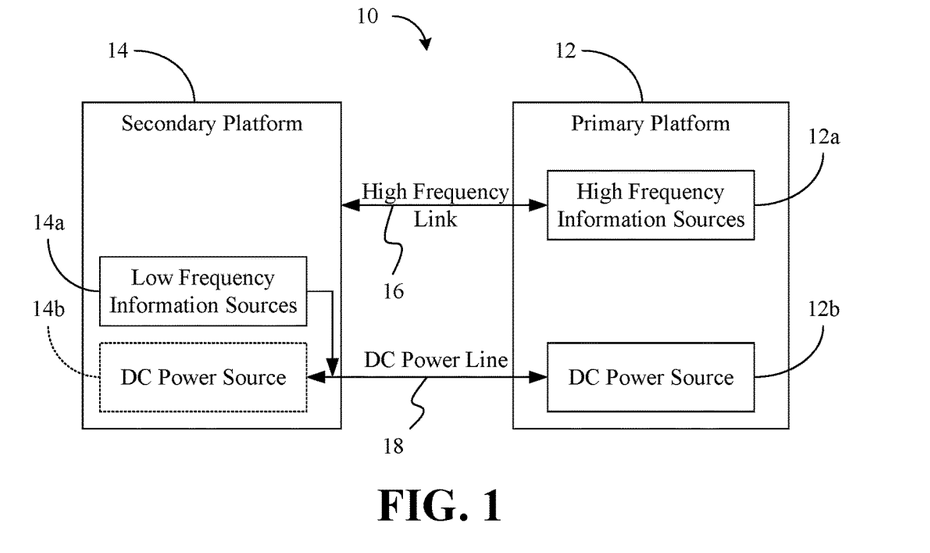
FIG. 1 is a block diagram of an example of a computing system according to an embodiment.

Turning now to FIG. 1, a computing system 10 is shown in which a primary platform 12 (12a-12b) having one or more high frequency information sources 12a and a direct current (DC) power source 12b (e.g., battery) is coupled to a secondary platform 14 (14a-14b) having one or more low frequency information sources 14a and an optional DC power source 14b (e.g., battery). In one example, the primary platform 12 is a computing subsystem such as, for example, a tablet computer, wherein the high frequency information sources 12a might include, for example, processors, chipsets, input/output (IO) modules, network controllers, clocks, etc., that supply information to the secondary platform 14 over a high frequency link 16 (e.g., USB link, wireless link). If the data generated by the high frequency information sources 12a is not used by the secondary platform 14 (e.g., in a unidirectional configuration), the high frequency link 16 may be eliminated altogether.

Additionally, the secondary platform 14 may be a peripheral subsystem such as, for example, a base device, wherein the low frequency information sources 14a might include, for example, a keyboard, keypad, touchpad, mouse, etc., that captures user input data. The low frequency information sources 14a may also include a power management controller that generates low speed control signals or an audio source that generates audio data. Thus, when coupled to one another, the primary platform 12 and the secondary platform 14 may enable the computing system 10 to operate in a notebook form factor. The computing system 10 might also be configured to operate as a tablet computer by, for example, disconnecting the platforms 12, 14 or folding the secondary platform 14 behind the primary platform 12 while the platforms 12, 14 remain connected. The computing system 10 may also have other form factors such as, for example, a desktop computer, workstation, smart phone (e.g., with detachable keyboard), and so forth.

The DC power source 12b of the primary platform 12 may use a DC power line 18 to supply power to the secondary platform 14 and/or charge the DC power source 14b of the secondary platform 14. Additionally, the DC power source 14b of the secondary platform 14 may supply power to the primary platform 12 and/or charge the DC power source 12b of the primary platform 12, depending on the circumstances. In the illustrated example, the data generated by the low frequency information sources 14a is modulated onto the DC power line 18. Thus, for example, keystroke data generated in response to a user typing on the keyboard of the secondary platform 14 may be transmitted via the DC power line 18 for display on the primary platform 12 and/or other processing. Such an approach may obviate any need for extra pins dedicated to I2C communications and may in turn reduce connector size as well as overall system cost. Moreover, the illustrated solution has no latency impact on the communications between the platforms 12, 14.

Figure 2A:
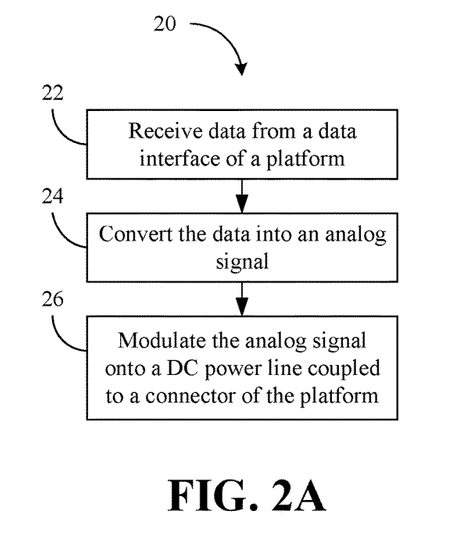
FIG. 2A is a flowchart of an example of a method of processing data according to an embodiment.

FIG. 2A shows a method 20 of processing data in a platform such as, for example, the secondary platform 14 (FIG. 1), already discussed. The method 20 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 22 provides for receiving data from a data interface of the platform. The data interface might include, for example, an I2C interface, microcontroller, etc., wherein the data may include user input data (e.g., associated with an input device such as a mouse, keyboard, keypad, touchpad, etc.), control signals and/or audio data. Block 24 may convert the data into an analog signal and the analog signal may be modulated onto a DC power line coupled to a connector of the platform at block 26. Block 26 may include using frequency-shift keying (FSK), phase-shift keying (PSK), etc., to modulate the analog signal onto the DC power line.

For example, FSK may generally enable digital information to be communicated across a link using discrete frequency changes of a carrier wave. One approach might be to use two discrete frequencies to transmit a binary signal (e.g., one/zero, mark/space). Thus, a relatively low speed signal (e.g., 19.2 kbps) may be communicated using relatively low speed carrier frequencies (e.g., 230 kHz). In such an example, the mark/space frequencies may be, for example, 222 kHz/238 kHz. Higher bit rates may be obtained by increasing the carrier frequency in order to ensure that a sufficient number of cycles are communicated across the link and a low bit error rate (BER) is maintained. The values provided herein are to facilitate discussion only and may vary depending on the circumstances.

Figure 2B:
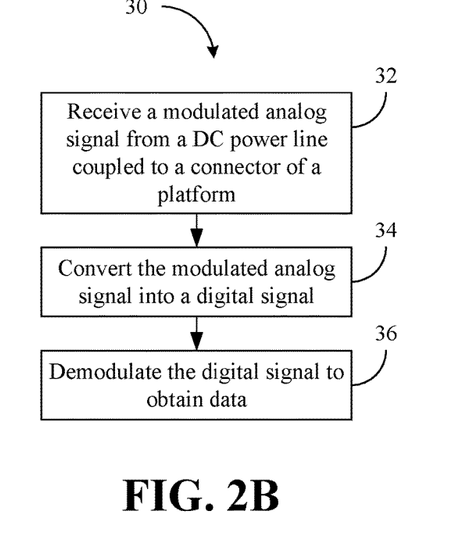
FIG. 2B is a flowchart of an example of a method of processing analog signals according to an embodiment.

FIG. 2B shows a method 30 of processing analog signals in a platform such as, for example, the primary platform 12 (FIG. 1), already discussed. The method 30 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 32 provides for receiving a modulated analog signal from a DC power line coupled to a connector of a platform. As already discussed, the modulated analog signal may include, for example, FSK information, PSK information, and so forth. Block 34 may convert the modulated analog signal into a digital signal and the digital signal may be demodulated at block 36 to obtain data. The data, which may include user input data (e.g., associated with a peripheral input device such as a mouse, keyboard, keypad, touchpad, etc.) and/or audio data, may be sent to an I2C interface or other appropriate component of the platform.

Figure 3A:
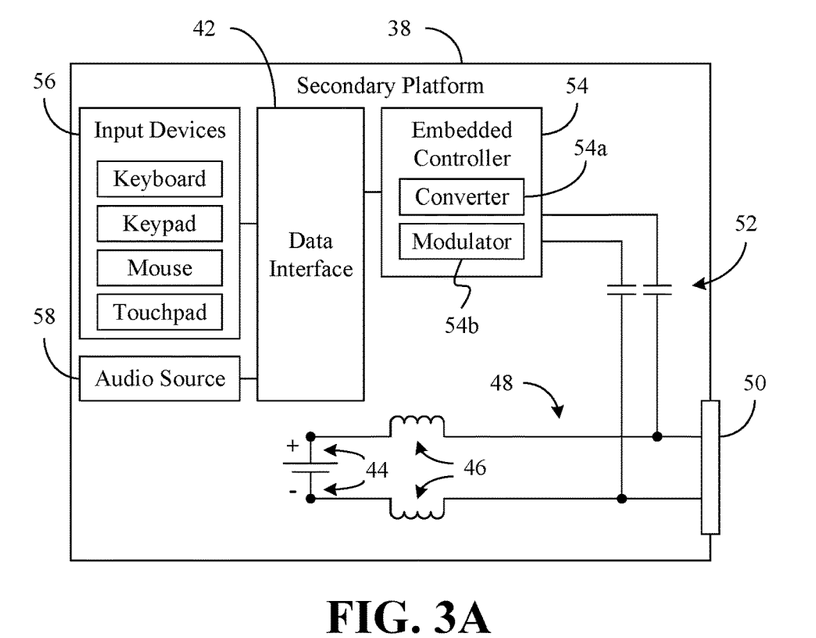
FIGS. 3A and 3B are schematic diagrams of an example of a unidirectional system according to an embodiment.
Figure 3B:
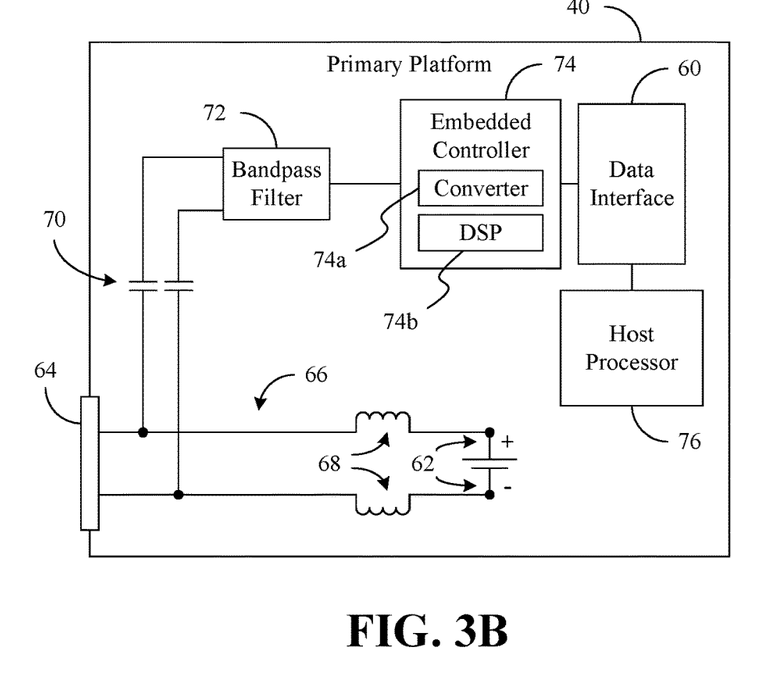

Turning now to FIGS. 3A and 3B, a unidirectional example of a secondary platform 38 and a primary platform 40, respectively, is shown in greater detail. In the illustrated example, the secondary platform 38 functions as a data generation platform when coupled to the primary platform 40 and includes a data interface 42 (e.g., I2C interface), a power port 44, a low pass filter (LPF) 46 coupled to the power port 44, a DC power line 48 coupled to the low pass filter 46, and a connector 50 coupled to the DC power line 48. Additionally, a high pass filter (HPF) 52 may be coupled to the DC power line 48 and an embedded controller 54 (54a-54b) may be coupled to the high pass filter 52 and the data interface 42. The illustrated embedded controller 54 includes a converter 54a (e.g., digital to analog converter/ DAC) that receives data from the data interface 42 and converts the data into an analog signal. The data may include, for example, user input data associated with one or more input devices 56 (e.g., keyboard, keypad, mouse, touchpad), audio data associated with an audio source 58, etc., and/or any other low frequency information sources.

The embedded controller 54 may also include a modulator 54b that modulates the analog signal onto the DC power line 48 via the high pass filter 52. The modulator 54b may use FSK, PSK, etc., to modulate the analog signal onto the DC power line 48. In the case of FSK, the mark/space frequencies may be chosen to avoid interference with the switching frequencies of regulators within power delivery circuits to ensure that noise is minimized and an optimal BER is achieved. In this regard, the low pass filter 46 may ensure that power delivery remains a low frequency phenomenon that does not impact FSK communication.

The primary platform 40 may function as a unidirectional data consumption platform when coupled to the secondary platform 38 and includes a data interface 60 (e.g., I2C interface), a connector 64, a DC power line 66 coupled to the connector 64, a low pass filter 68 coupled to the DC power line 66, and a power port 62 coupled to the low pass filter 68. Additionally, a high pass filter 70 may be coupled to the DC power line 66, a bandpass filter 72 may be coupled to the high pass filter 70, and an embedded controller 74 (74a-74b) may be coupled to the bandpass filter 72 and the data interface 60. The illustrated embedded controller 74 includes a converter 74a (e.g., analog to digital converter/ ADC) that receives, via the high pass filter 70 and the bandpass filter 72, a modulated analog signal from the DC power line 66 and converts the modulated analog signal to a digital signal. The modulated analog signal may include, for example, FSK information, PSK information, and so forth.

The embedded controller 74 may also include a digital signal processor (DSP) 74b to demodulate the digital signal to obtain data. As already noted, the data may include, for example, user input data associated with the one or more peripheral input devices 56 (e.g., keyboard, keypad, mouse, touchpad), audio data associated with an audio source 58, etc., or any combination thereof. In the case of FSK, the bandpass filter 72 may be implemented as two bandpass filters having center frequencies that align with the mark/ space frequencies established by the modulator 54b of the secondary platform 38 (e.g., in order to remove out-of-band frequencies). Additionally, the low pass filter 68 and the high pass filter 70 may further clean the modulated analog signal received from the DC power line 66.

Thus, when the connector 50 of the secondary platform 38 is mated with the connector 64 of the primary platform 40, the user input data and/or the audio data obtained via the input device 56 and/or the audio source 58, respectively, may be communicated from the secondary platform 38 to the primary platform 40 without adding any pins/contacts beyond the pins/contacts used to deliver power between the first and second platforms 40, 38. Accordingly, reduced connector size and less cost may be achieved without impacting communication latency. A host processor 76 in the primary platform 40 may in turn process the data for presentation (visual and/or audio), storage and/or further transmission to other components (e.g., on-platform or off-platform).

Figure 4A:
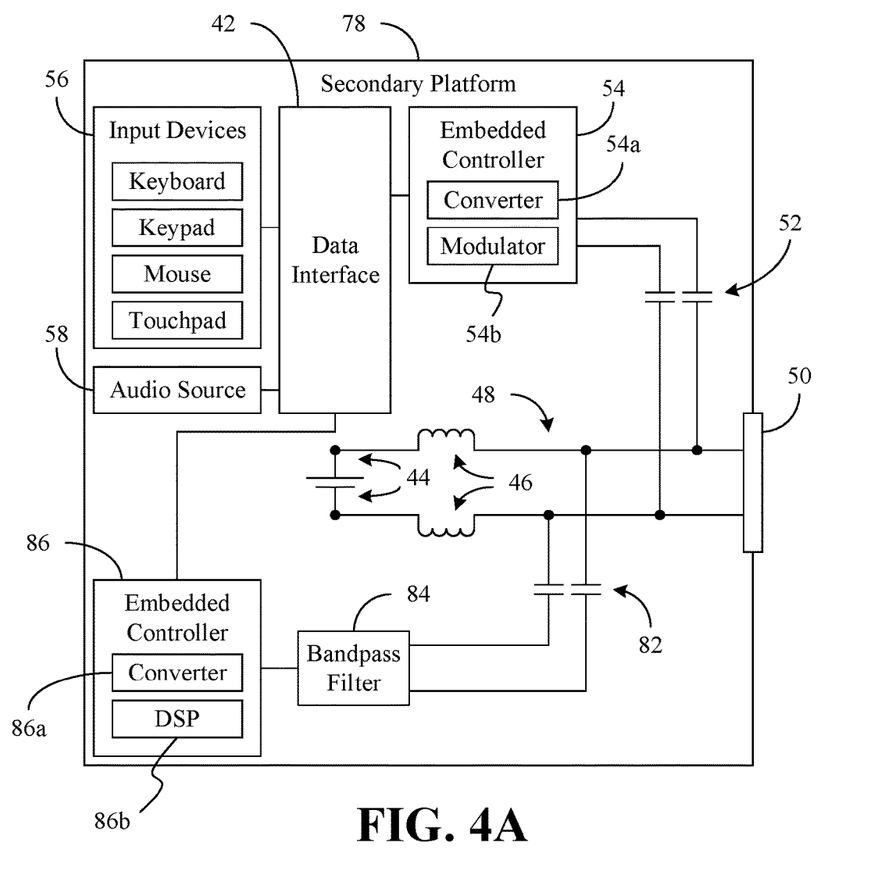
FIGS. 4A and 4B are schematic diagrams of an example of a bidirectional system according to an embodiment.
Figure 4B:
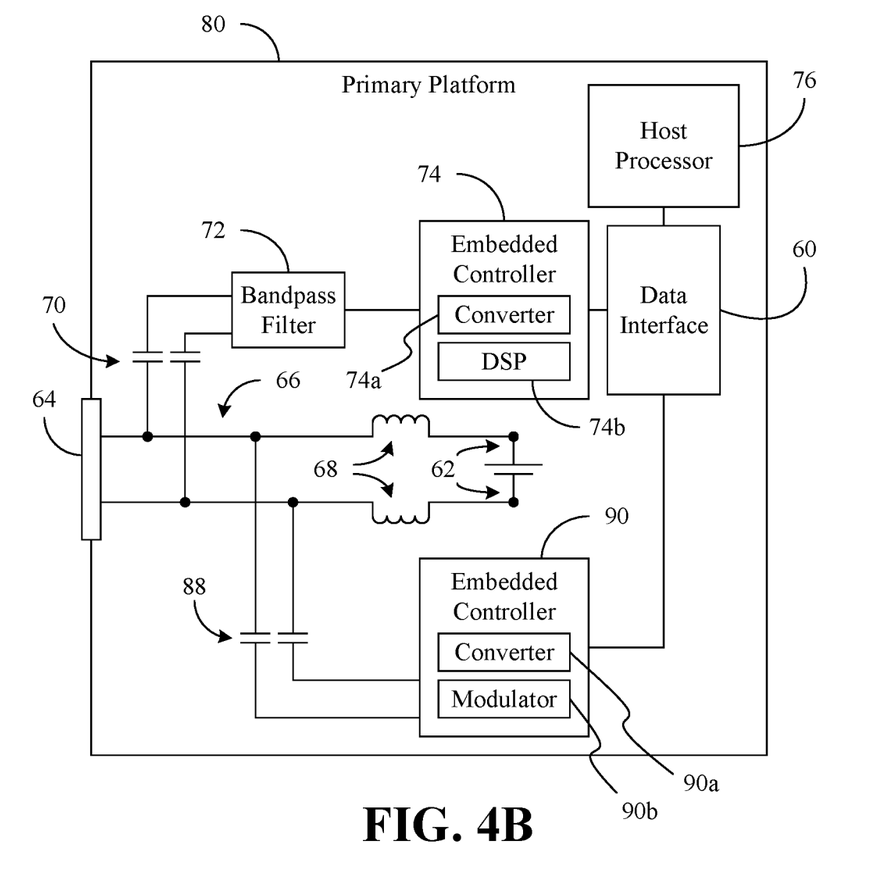

FIGS. 4A and 4B show a bidirectional example of a secondary platform 78 and a primary platform 80, respectively, in greater detail. In the illustrated example, the secondary platform 78 functions as both a data generation platform and a data consumption platform when coupled to the primary platform 80. More particularly, the secondary platform 78 may include a second high pass filter 82 coupled to the DC power line 48, a bandpass filter 84 coupled to the second high pass filter 82, and a second embedded controller 86 (86a-86b) coupled to the bandpass filter 84 and the data interface 42. The high pass filters 52, 82 may be combined, depending on the circumstances. Additionally, the embedded controllers 54, 86 may be combined. The illustrated second embedded controller 86 includes a converter 86a (e.g., ADC) that receives, via the high pass filter 82 and the bandpass filter 84, a modulated signal from the DC power line 48 and converts the modulated analog signal to a digital signal. The modulated signal may include, for example, FSK information, PSK information, and so forth.

The second embedded controller 86 may also include a DSP 86b to demodulate the digital signal to obtain data. The data may include, for example, user input data associated with one or more input devices (e.g., touchscreen, not shown) of the primary platform 80, audio data (e.g., streaming data from a network connection), etc., or any combination thereof. In the case of FSK, the bandpass filter 84 may be implemented as two bandpass filters having center frequencies that align with the mark/space frequencies established by the primary platform 80. The mark/space frequencies may be the same for sending and receiving data provided that a half-duplex or other suitable handshaking protocol is used by the platforms 78, 80. Additionally, the second high pass filter 82 may further clean the modulated analog signal received from the DC power line 48.

Similarly, the illustrated primary platform 80 may function as both a data generation platform and a data consumption platform when coupled to the secondary platform 78. More particularly, the illustrated primary platform 80 includes a second high pass filter 88 coupled to the DC power line 66 and a second embedded controller 90 (90a-90b) coupled to the second high pass filter 88 and the data interface 60. The high pass filters 70, 88 may be combined, depending on the circumstances. Additionally, the embedded controllers 74, 90 may be combined. The second embedded controller 90 may include a converter 90a (e.g., DAC) that receives data from the data interface 60 and converts the data into an analog signal. As already noted, the data may include, for example, user input data associated with one or more input devices (e.g., touchscreen, not shown) of the primary platform 80, audio data (e.g., streaming data from a network connection), etc., or any other low frequency information sources. The illustrated embedded controller 90 also includes a modulator 90b to modulate the analog signal onto the DC power line 66 via the high pass filter 88.

ADDITIONAL NOTES AND EXAMPLES

Example 1 may include a data generation platform comprising a data interface, a power port, a low pass filter coupled to the power port, a direct current (DC) power line coupled to the low pass filter, a connector coupled to the DC power line, a high pass filter coupled to the DC power line, and an embedded controller coupled to the data interface and the high pass filter, the embedded controller including a converter to receive data from the data interface and convert the data into an analog signal, and a modulator to modulate the analog signal onto the DC power line via the high pass filter.

Example 2 may include the platform of Example 1, wherein the data is to include user input data.

Example 3 may include the platform of Example 2, further including an input device, wherein the user input data is to be associated with the input device and the input device includes one or more of a mouse, a keyboard, a keypad or a touchpad.

Example 4 may include the platform of Example 1, wherein the data is to include audio data.

Example 5 may include the platform of Example 1, wherein the modulator is to use one of frequency-shift keying or phase-shift keying to modulate the analog signal onto the DC power line.

Example 6 may include the platform of any one of Examples 1 to 5, wherein the data interface includes an inter-integrated (I2C) interface.

Example 7 may include a data consumption platform comprising a data interface, a connector, a direct current (DC) power line coupled to the connector, a low pass filter coupled to the DC power line, a power port coupled to the low pass filter, a high pass filter coupled to the DC power line, a bandpass filter coupled to the high pass filter, and an embedded controller coupled to the bandpass filter and the data interface, the embedded controller including a converter to receive a modulated analog signal from the DC power line via the high pass filter and the bandpass filter, and convert the modulated analog signal to a digital signal, and a digital signal processor to demodulate the digital signal to obtain data.

Example 8 may include the platform of Example 7, wherein the data is to include user input data.

Example 9 may include the platform of Example 8, wherein the user input data is to be associated with a peripheral input device including one or more of a mouse, a keyboard, a keypad or a touchpad.

Example 10 may include the platform of Example 7, wherein the data is to include audio data.

Example 11 may include the platform of Example 7, wherein the modulated analog signal is to include one or frequency-shift keying information or phase-shift keying information.

Example 12 may include the platform of Example 7, wherein the data interface is an inter-integrated circuit (I2C) interface.

Example 13 may include a method of processing data, comprising receiving data from a data interface of a platform, converting the data into an analog signal, and modulating the analog signal onto a direct current (DC) power line coupled to a connector of the platform.

Example 14 may include the method of Example 13, wherein the data includes user input data.

Example 15 may include the method of Example 14, wherein the user input data is associated with an input device including one or more of a mouse, a keyboard, a keypad or a touchpad.

Example 16 may include the method of Example 13, wherein the data includes audio data.

Example 17 may include the method of Example 13, further including using one of frequency-shift keying or phase-shift keying to modulate the analog signal onto the DC power line.

Example 18 may include the method of any one of Examples 13 to 17, wherein the data is received from an inter-integrated circuit (I2C) interface.

Example 19 may include a method of processing analog signals, comprising receiving a modulated analog signal from a direct current (DC) power line coupled to a connector of a platform, converting the modulated analog signal to a digital signal, and demodulating the digital signal to obtain data.

Example 20 may include the method of Example 19, wherein the data includes user input data.

Example 21 may include the method of Example 20, wherein the user input data is associated with a peripheral input device including one or more of a mouse, a keyboard, a keypad or a touchpad.

Example 22 may include the method of Example 19, wherein the data includes audio data.

Example 23 may include the method of Example 19, wherein the modulated analog signal includes one of frequency-shift keying information or phase-shift keying information.

Example 24 may include the method of any one of Examples 19 to 23, further including sending the data to an inter-integrated circuit (I2C) interface.

Example 25 may include an embedded controller to process data, comprising a converter to receive data from a data interface of a platform and convert the data into an analog signal, and a modulator to modulate the analog signal onto a direct current (DC) power line coupled to a connector of the platform.

Example 26 may include the embedded controller of Example 25, wherein the data is to include user input data.

Example 27 may include the embedded controller of Example 26, wherein the user input data is to be associated with an input device including one or more of a mouse, a keyboard, a keypad or a touchpad.

Example 28 may include the embedded controller of Example 25, wherein the data is to include audio data.

Example 29 may include the embedded controller of Example 25, wherein the modulator is to use one of frequency-shift keying or phase-shift keying to modulate the analog signal onto the DC power line.

Example 30 may include the embedded controller of any one of Examples 25 to 29, wherein the data is to be received from an inter-integrated (I2C) interface.

Example 31 may include an embedded controller to process modulated analog signals, comprising a converter to receive a modulated analog signal from a direct current (DC) power line coupled to a connector of a platform and convert the modulated analog signal to a digital signal, and a digital signal processor to demodulate the digital signal to obtain data.

Example 32 may include the embedded controller of Example 31, wherein the data is to include user input data.

Example 33 may include the embedded controller of Example 32, wherein the user input data is to be associated with a peripheral input device including one or more of a mouse, a keyboard, a keypad or a touchpad.

Example 34 may include the embedded controller of Example 31, wherein the data is to include audio data.

Example 35 may include the embedded controller of Example 31, wherein the modulated analog signal is to include one or frequency-shift keying information or phase-shift keying information.

Example 36 may include the embedded controller of any one of Examples 31 to 35, wherein the digital signal processor is to send the data to an inter-integrated circuit (I2C) interface.

Example 37 may include at least one computer readable storage medium comprising a set of instructions which, when executed by an embedded controller of a platform to process data, cause the embedded controller to receive data from a data interface of the platform, convert the data into an analog signal, and modulate the analog signal onto a direct current (DC) power line coupled to a connector of the platform.

Example 38 may include the at least one computer readable storage medium of Example 37, wherein the data is to include user input data.

Example 39 may include the at least one computer readable storage medium of Example 38, wherein the user input data is to be associated with an input device including one or more of a mouse, a keyboard, a keypad or a touchpad.

Example 40 may include the at least one computer readable storage medium of Example 37, wherein the data is to include audio data.

Example 41 may include the at least one computer readable storage medium of Example 37, wherein the instructions, when executed, cause the embedded controller to use one of frequency-shift keying or phase-shift keying to modulate the analog signal onto the DC power line.

Example 42 may include the at least one computer readable storage medium of any one of Examples 37 to 41, wherein the data is to be received from an inter-integrated (I2C) interface.

Example 43 may include at least one computer readable storage medium comprising a set of instructions which, when executed by an embedded controller of a platform to process analog signals, cause the embedded controller to receive a modulated analog signal from a direct current (DC) power line coupled to a connector of a platform, convert the modulated analog signal to a digital signal, and demodulate the digital signal to obtain data.

Example 44 may include the at least one computer readable storage medium of Example 43, wherein the data is to include user input data.

Example 45 may include the at least one computer readable storage medium of Example 44, wherein the user input data is to be associated with a peripheral input device including one or more of a mouse, a keyboard, a keypad or a touchpad.

Example 46 may include the at least one computer readable storage medium of Example 43, wherein the data is to include audio data.

Example 47 may include the at least one computer readable storage medium of Example 43, wherein the modulated analog signal is to include one or frequency-shift keying information or phase-shift keying information.

Example 48 may include the at least one computer readable storage medium of any one of Examples 43 to 47, wherein the instructions, when executed, cause the embedded controller to send the data to an inter-integrated circuit (I2C) interface.

Example 49 may include an embedded controller to process data, comprising means for performing the method of any one of Examples 25 to 30.

Example 50 may include an embedded controller to process modulated analog signals, comprising means for performing the method of any one of Examples 31 to 36.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A data generation platform comprising:
   a data interface; a power port;
   a low pass filter coupled to the power port;
   a direct current (DC) power line coupled to the low pass filter;
   a connector coupled to the DC power line;
   a high pass filter coupled to the DC power line;
   a bandpass filter coupled to the high pass filter;
   a first embedded controller coupled between the data interface and the high pass filter, the first embedded controller including:
      a converter to receive data from the data interface and convert the data into an analog signal, and
      a modulator to modulate the analog signal onto the DC power line via the high pass filter; and
   a second embedded controller coupled between the bandpass filter and the data interface.

2. The platform of claim 1, wherein the data is to include user input data.

3. The platform of claim 2, further including an input device, wherein the user input data is to be associated with the input device and the input device includes one or more of a mouse, a keyboard, a keypad or a touchpad.

4. The platform of claim 1, wherein the data is to include audio data.

5. The platform of claim 1, wherein the modulator is to use one of frequency-shift keying or phase-shift keying to modulate the analog signal onto the DC power line.

6. The platform of claim 1, wherein the data interface includes an inter-integrated circuit (I2C) interface.

7. A method of processing data, comprising:
   receiving data from a data interface of a platform;
   converting the data into an analog signal; and
   modulating the analog signal onto a direct current (DC) power line coupled to a connector of the platform; and
   converting the modulated analog signal to a digital signal;
   wherein the data is converted to the analog signal by a first converter connected between the data interface and a high-pass filter, and
   wherein the modulated analog signal is converted to the digital signal by a second converter connected between a band pass filter and the data interface.

8. The method of claim 7, wherein the data includes user input data.

9. The method of claim 8, wherein the user input data is associated with an input device including one or more of a mouse, a keyboard, a keypad or a touchpad.

10. The method of claim 7, wherein the data includes audio data.

11. The method of claim 7, further including using one of frequency-shift keying or phase-shift keying to modulate the analog signal onto the DC power line.

12. The method of claim 7, wherein the data is received from an inter-integrated circuit (I2C) interface.

* * * * *